United States Patent
Lewis

(10) Patent No.: US 9,881,162 B2
(45) Date of Patent: Jan. 30, 2018

(54) SYSTEM AND METHOD FOR AUTO-ENROLLING OPTION ROMS IN A UEFI SECURE BOOT DATABASE

(71) Applicant: Insyde Software Corp., Taipei (TW)

(72) Inventor: Timothy Andrew Lewis, El Dorado Hills, CA (US)

(73) Assignee: Insyde Software Corp., Taipei (TW)

( * ) Notice: Subject to any disclaimer, the term of this patent is extended or adjusted under 35 U.S.C. 154(b) by 228 days.

(21) Appl. No.: 14/484,819

(22) Filed: Sep. 12, 2014

(65) Prior Publication Data

US 2015/0074387 A1    Mar. 12, 2015

Related U.S. Application Data

(60) Provisional application No. 61/877,082, filed on Sep. 12, 2013.

(51) Int. Cl.
*G06F 21/57* (2013.01)
*G06F 9/44* (2006.01)

(52) U.S. Cl.
CPC .......... *G06F 21/575* (2013.01); *G06F 9/4401* (2013.01); *G06F 9/4418* (2013.01)

(58) Field of Classification Search
CPC .............................. G06F 21/575; G06F 9/4401
USPC ...................................................... 713/1, 2
See application file for complete search history.

(56) References Cited

U.S. PATENT DOCUMENTS

| | | | | |
|---|---|---|---|---|
| 7,890,742 B2* | 2/2011 | Rostampour | ......... | G06F 9/4411 713/1 |
| 8,560,822 B1* | 10/2013 | Chan | ......... | G06F 8/65 713/1 |
| 8,863,309 B2* | 10/2014 | Wang | ......... | G06F 21/57 713/2 |
| 2003/0106052 A1* | 6/2003 | Morrison | ......... | G06F 8/65 717/170 |
| 2012/0124357 A1* | 5/2012 | Zimmer | ......... | G06F 1/3203 713/2 |
| 2013/0124843 A1* | 5/2013 | Bobzin | ......... | G06F 21/575 713/2 |

* cited by examiner

*Primary Examiner* — Thomas Lee
*Assistant Examiner* — Santosh R Poudel
(74) *Attorney, Agent, or Firm* — McCarter & English, LLP; John S. Curran

(57) ABSTRACT

A mechanism for automatically enrolling option ROMs into the system security database used for a UEFI Secure Boot is discussed. A request is received by a computing device to auto-enroll one or more option ROMs for one or more respective devices on the next boot of the system. Upon receiving the request, a flag or other type of indicator indicative of an auto-enroll status is changed to an active mode. The indicator is stored in non-volatile memory and may be stored as a UEFI Authenticated Variable. Following the changing of the indicator, the system is either reset or shut down. During the next boot only, after identifying the indicator indicative of an active mode auto-enroll status, the signatures for the option ROMs of all discovered devices whose signatures do not exist in the system security database are calculated (hashed) and added to the UEFI Secure Boot database without user interaction.

18 Claims, 5 Drawing Sheets

SYSTEM AND METHOD FOR AUTO-ENROLLING OPTION ROMS IN A UEFI SECURE BOOT DATABASE

RELATED APPLICATION

This application is related to, and claims the benefit of, U.S. Provisional Patent Application No. 61/877,082, entitled "System and Method for Auto-Enrolling Option ROMS in a UEFI Secure Boot Database", filed Sep. 12, 2013, the contents of which are incorporated herein by reference in their entirety.

BACKGROUND

Computing devices are initialized by firmware included within the device and this firmware provides a range of software services which facilitate the boot of the operating system (OS) as well as providing a subset of these services that continue to be available after the operating system has booted. Firmware is software that has been written onto Read-Only Memory (ROM) modules including, but not limited to, ROM, PROM, EPROM, EEPROM, and Flash memory (collectively referred to hereafter as "ROM"). Among other services, the firmware is responsible for operation of the computing device until a boot process can be run which loads an operating system for the computing device into memory. Once loaded, the operating system is in charge of normal operation of the computing device although the provision of certain services after loading of the operating system may require a transition of control from the operating system back to the firmware for security and other reasons.

Unified Extensible Firmware Interface (UEFI) is a specification created by a non-profit industry body detailing a programming interface between the Operating System and the included firmware of a computing device such as, but not limited to, a Personal Computer (PC). UEFI specifications describe a set of tools by which a computing device can move in an organized fashion from the power-applied state to fully operational. The UEFI specification tells the desired result but deliberately does not specify the internal tactic of implementation. The UEFI firmware specification replaces earlier operating system (OS)/firmware interfaces previously used by the industry and commonly known as legacy BIOS (Basic Input Output System).

An option ROM driver (also referred to hereafter as "option ROM" or "driver") is binary code to extend the BIOS or UEFI firmware to support a specific hardware device. It may include initialization, boot-related services and hardware device management. The option ROM may be included on a flash store on a plug-in card when the card is shipped or may be a driver associated with a card (or other device in the system) that is separately downloaded or otherwise communicated to the computing device. The BIOS (or UEFI Firmware) executes the option ROM when a matching plug-in adapter card (or device on the motherboard) is discovered. The option ROM is used to communicate with the associated hardware device.

Computer systems may contain one or more expansion slots such as those conforming to the Peripheral Component Interconnect (PCI) Express specification. These slots can be used to install optional input-output boards (also referred to as "expansion cards" or "option cards") which expand the capabilities of the system. These expansion cards may include legacy BIOS components (legacy BIOS components include system BIOS which is delivered with and supports the system platform and legacy option ROMS which are incorporated into option cards and which support the initialization of the card). The UEFI specification provides the ability to create UEFI firmware for the system board as well as enabling a UEFI option ROM driver to be incorporated into the expansion card by the manufacturer. Unfortunately however, while the industry transitions towards greater support for computing devices having UEFI-compliant firmware, many currently manufactured expansion cards still frequently include only legacy option ROMs rather than the UEFI format signed option ROMs envisioned by the UEFI specification.

The lack of UEFI format signed option ROMs for a device included in a computing system with UEFI-compliant firmware becomes important when the system executes a "Secure Boot" process defined in the UEFI specification. During the conventional UEFI Secure Boot process only validated executable code is executed during a boot sequence. The conventional Secure Boot process depends upon validation of executable code against a local system security database stored in a UEFI authenticated variable. During this process there are ordinarily only two ways in which the code can be validated and therefore approved for execution during the boot process. The first way to validate executable code is that the executable code is approved if the executable has been 'signed' by a certificate in the system security database. The same certificate may have been used to sign a large number of 'executables'. The second way to validate executable code is that an exact hash of the executable that had been previously stored in the system security database matches a hash of the executable being offered for execution (each hash uniquely identifies only the code upon which it was based and any alteration to that code after the storing of the hash will result in a mismatch when comparing a hash of the altered code to the hash of the original code). Once validated, the executable code may be executed during the boot sequence. Code which is not validated through either mechanism, such as a legacy option ROM whose signature has not been previously stored in the system security database, is not allowed to execute during a conventional UEFI Secure Boot.

BRIEF SUMMARY

Embodiments of the present invention provide a mechanism for automatically enrolling option ROMs into the system security database used for a UEFI Secure Boot. A request is received by the computing device to auto-enroll one or more option ROMs for one or more respective devices on the next boot of the system. The devices associated with the option ROMs may or may not be currently present in the system. Upon receiving the request, a flag or other type of indicator indicative of an auto-enroll status is set to an active mode. The indicator is stored in non-volatile memory. In one embodiment, the indicator is stored as a UEFI Authenticated Variable. Following the changing of the indicator to an active mode, the system is either reset or shut down. If the system is shut down, a user has the opportunity to add new devices to the system before the system is re-powered. During the next boot only, after identifying the indicator indicative of an active mode auto-enroll status, the signatures for the option ROMs of all discovered devices whose signatures do not exist in the system security database are calculated (hashed) and added to the UEFI Secure Boot database without user interaction. Additional mechanisms may also be provided to ignore such auto-enrolled devices on future boots.

A computing device-implemented method for auto-enrolling option ROM drivers in a system security database used to perform a UEFI Secure Boot includes the step of receiving a request to auto-enroll a signature for at least one option ROM driver in the system security database of the computing device. An indicator of an auto-enroll mode stored in non-volatile storage is changed from an inactive mode to an active mode based on the request. The method also resets or shuts down the computing device subsequent to the changing of the indicator. A boot sequence for the computing device begins following the reset or shut down of the computing device and identifies at least one device having an option ROM driver whose signature is not present in the system security database. The active auto-enroll mode is also detected. The signature for the at least one device is automatically enrolled in the system security database based on the detection of the active auto-enroll mode without user interaction. The indicator of the auto-enroll mode is changed from the active mode back to the inactive mode before exiting the boot sequence. The option Rom driver for the at least one device is loaded into memory for execution based on the presence of the enrolled signature in the system security database.

In another embodiment, a computing device includes at least one expansion device and at least one option ROM driver for the at least one expansion device. The computing device also includes non-volatile storage holding a system security database used in performing a UEFI Secure Boot and an indicator of an auto-enroll mode for option ROM drivers in the computing device with the indicator set to an active mode. The computing device further includes firmware configured to perform a boot sequence for the computing device. The boot sequence identifies that a signature for the at least one option ROM driver is not present in the system security database, detects that the indicator of the auto-enroll mode is set to the active mode and automatically enrolls the signature for the at least one option ROM driver for the at least one expansion device in the system security database based on the detection of the active mode without user interaction. The at least one option Rom driver for the at least one expansion device is loaded into memory for execution based on the presence of the enrolled signature in the system security database.

BRIEF DESCRIPTION OF THE DRAWINGS

The accompanying drawings, which are incorporated in and constitute a part of this specification, illustrate one or more embodiments of the invention and, together with the description, help to explain the invention. In the drawings.

DETAILED DESCRIPTION

When implemented in a computing device, the machine codes for UEFI firmware and all permanent data used by the firmware reside in Read Only Memory (ROM). In many cases the ROM is an Electrically Erasable silicon device known as a flash ROM. Flash ROM has the characteristic that it can be erased by electrical command and individual elements may then be written and the device will retain the data indefinitely. When power is first applied to the computing device, the system executes a process called reset which clears the state to a known condition and begins execution of the firmware. The firmware is read from the ROM which may be partitioned into several functional divisions or regions. One such region is called the Authenticated Variable Region or Store that stores Authenticated Variables defined in the UEFI specification. One or more UEFI Authenticated Variables may be used to hold UEFI-defined security information including the system security database used to perform driver signature checking as outlined in the UEFI specification. In brief, driver signature checking is the process by which software from other parties can be 'signed' using public/private key cryptographic techniques at its origin and the signature is then validated by the computing system's UEFI-compliant firmware before the software is allowed to operate. The system security database holds a library of approved keys used to perform the signature checking. The system security database is also alternately referred to herein as the "Secure Boot database".

As noted above, in PC systems with expansion slots, the expansion devices may carry additional firmware (option ROMs) used to initialize devices, provide boot-related services and device management utilities. For example, video devices, input devices or storage devices implemented using the PCI 3.0 standard or ExpressCard standard provide such option ROMs. Per the UEFI specification, since these option ROMs are not a part of the system firmware, their signatures must be validated before their instructions are executed when the computer system is in a UEFI Secure Boot mode. However, older ("legacy" or non-UEFI) option ROMs, unsigned UEFI option ROMs or those provided during development cannot be validated because their signature is not found in the UEFI secure boot database. Therefore, the option ROMs are not loaded into memory (and so are not available for execution) and their functionality cannot be used during the boot sequence. This makes the computer system less useful than it would be otherwise.

Figure 1:
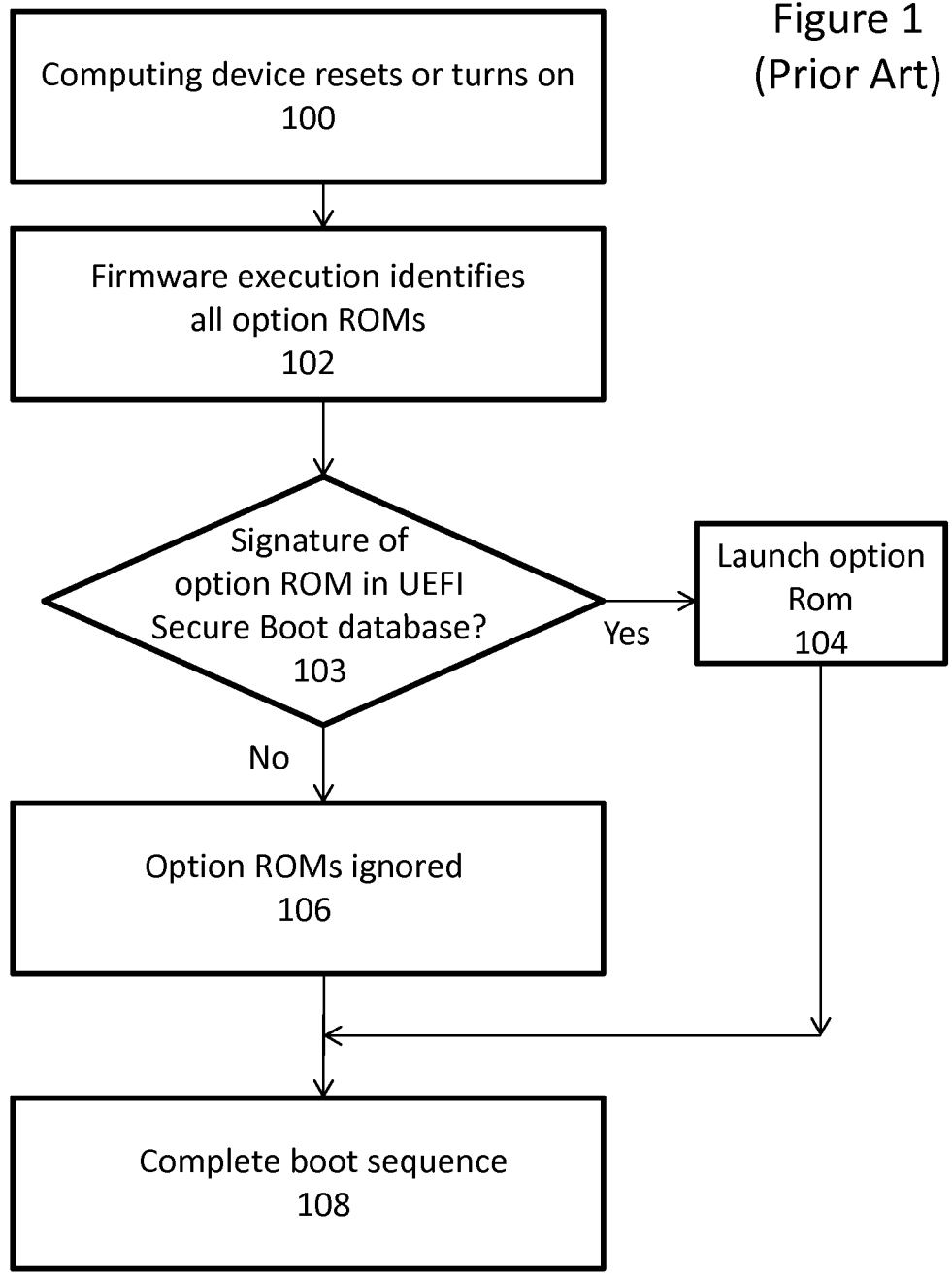
FIG. 1 (prior art) depicts an exemplary sequence of steps used to perform a Secure Boot in a computing device equipped with UEFI-compliant firmware.

FIG. 1 (prior art) depicts an exemplary conventional sequence of steps used to perform a Secure Boot in a computing device equipped with UEFI-compliant firmware. The sequence begins execution as the computing device resets or turns on (step 100), depending on whether the computing device was restarting following a reset or powering up from shut down, at the CPU reset vector inside the firmware. During the boot sequence, the firmware initializes hardware devices and identifies all option ROMs for the devices (step 102). For each option ROM, the firmware checks to see if the signature of the option ROM is in the Secure Boot database (step 103). If the signature is in the Secure Boot database (step 103), the option ROM is launched (step 104) (i.e. loaded into memory and executed) with the result that the associated hardware device is available for use during the boot sequence before loading of the operating system. If the signature is not in the Secure Boot database (step 103), the option ROM is ignored (step 106) and the associated hardware device is unavailable during the boot sequence. After all the option ROMs are handled, the boot sequence continues until completion (step 108).

Previous attempts to address the issue of using option ROMs whose signature is not found in the UEFI Secure Boot database have used one of two approaches. In a first approach the UEFI Secure Boot mode is turned off before the boot sequence begins with the result that signatures are not checked. However, as this disables checking of all option ROMs and in most systems OS boot loaders as well, this makes the system significantly less secure and is an undesirable solution to the problem in most circumstances. Other approaches have required some degree of user interaction during the enrollment process. For example, a user may be presented with a list of all unenrolled device option ROMs from which the user can choose enrollment or the user may be prompted during a boot sequence about the discovery of a device and requested to enroll its signature to the UEFI secure boot database. However, these approaches require user interaction with the computing device and introduces user error and security issues into the process.

Figure 2:
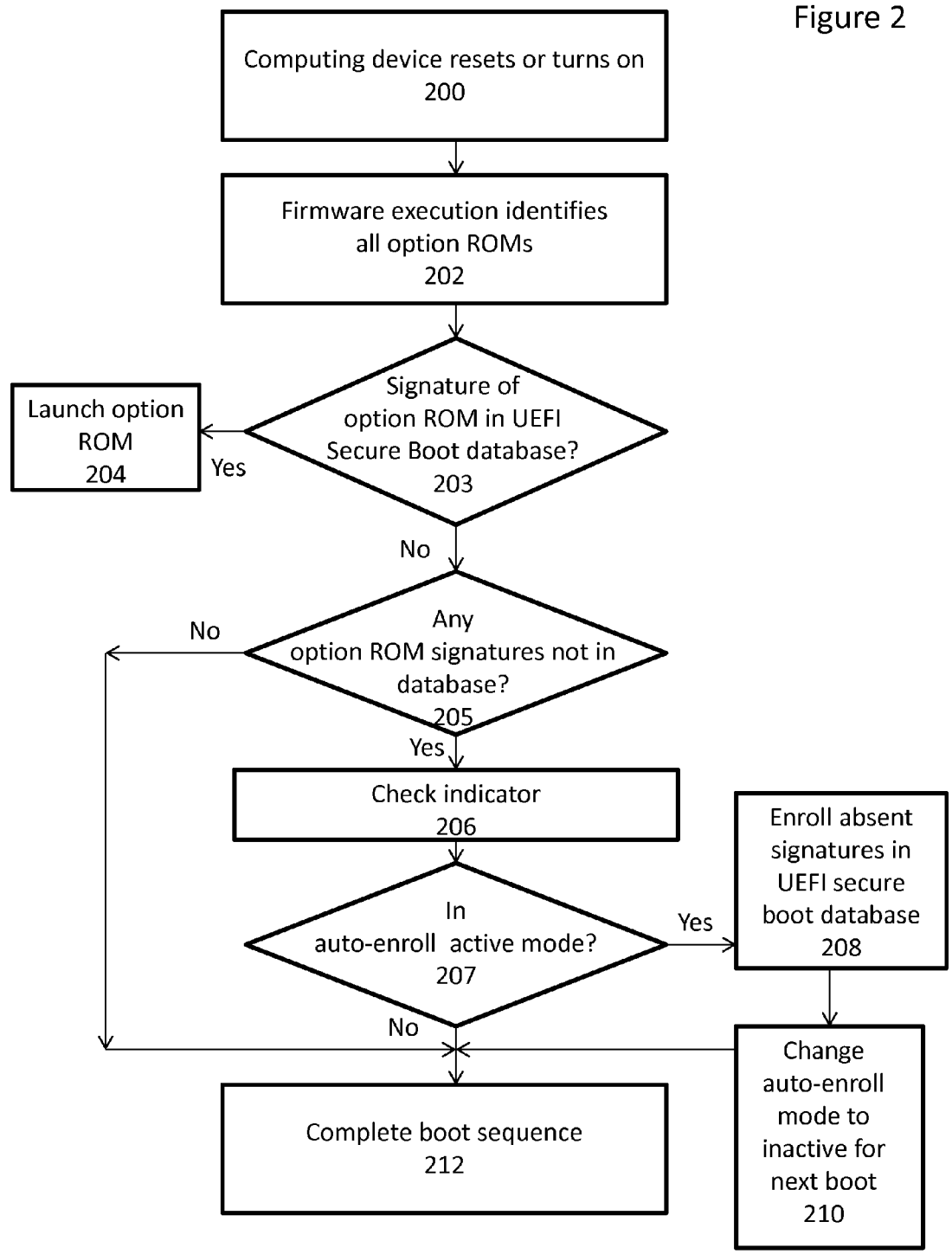
FIG. 2 depicts an exemplary sequence of steps performed by an embodiment of the present invention to auto-enroll option ROMs during a boot sequence.

In contrast to these previous techniques, embodiments of the present invention provide a technique to automatically enroll option ROMs into the UEFI secure boot database on the next boot only without user interaction. More particularly, embodiments of the present invention rely on the presence and contents of an indicator in non-volatile storage such as a secure UEFI Authenticated Variable. FIG. 2 depicts an exemplary sequence of steps performed by an embodiment of the present invention to auto-enroll option ROMs during a boot sequence based on the contents of an indicator in non-volatile storage. The sequence begins much like the conventional Secure Boot process depicted in FIG. 1. More specifically, the sequence begins execution as the computing device resets or turns on (step 200), depending on whether the computing device was restarting following a reset or powering up from shut down, at the CPU reset vector inside the firmware. During the boot sequence, the firmware initializes hardware devices and identifies all option ROMs for the devices (step 202). For each option ROM, the firmware checks to see if the signature of the option ROM is in the Secure Boot database (step 203). If the signature is in the Secure Boot database (step 203), the option ROM is launched (step 204). If there are no option ROMs whose signatures were absent from the UEFI secure boot database (step 205), then the boot sequence continues to completion (step 212). However, if there are any option ROM signatures that are not in the system security database (step 205), the indicator of auto-enroll status in non-volatile storage is checked to see if it indicates an active mode (step 207). This check may be performed by the firmware examining a UEFI Authenticated Variable or other location in non-volatile storage for a flag or other indicator. If the indicator indicates that the system is in an auto-enroll active mode, all of the option ROMs absent from the database are enrolled in the Secure Boot database (step 208). For example, a hash of each of the option ROMs whose signatures were absent from the UEFI Secure Boot database may be calculated per chapter 27.5 of the UEFI specification. Usually this is a SHA-256 hash of the entire image, but other signature types are possible within the scope of the present invention. In one embodiment, specific option ROM signatures may be calculated instead of all option ROMs with additional configuration information stored with the auto-enroll mode information. The additional information may specify which device option ROM signatures should be calculated and/or which should be skipped during the subsequent boot.

If the firmware identifies an auto-enroll active mode (step 207), the status may be automatically reset by the firmware to an inactive mode before the boot sequence completes (step 210) (after performing or scheduling the auto-enrollment of the absent signatures) so that the next time the indicator is encountered during the next boot sequence the normal Secure Boot process will be performed instead of the auto-enroll process of the present invention. In this manner, an embodiment of the present invention may bypass the conventional Secure Boot process in favor of the auto-enroll process described herein only a single time. In an alternate embodiment, the firmware identifying the active mode of the indicator may update a counter value in response to identifying the active mode and compare the value to a pre-determined number. If the value equals the pre-determined number, the indicator is reset by the firmware to inactive mode (and the counter is reset to 0). If the value is less than the pre-determined number, the indicator is left unchanged in active mode. In this manner, the conventional Secure Boot process can be bypassed a pre-determined number of times but not continue indefinitely. The pre-determined value may be received from a user at the time of receiving a request to set the indicator to active mode (as described further below) or may be a permanently stored value available to the firmware. Once the signatures of the previously un-enrolled option ROM drivers have been added to the system security database/UEFI Secure Boot database, the boot sequence may continue to completion with the devices associated with the newly enrolled option ROMs available to the boot sequence. (step 212).

The auto-enroll process of the present invention thus allows a computing device that ordinarily executes a Secure Boot process which would prevent the use of non-validated option ROMs to be bypassed a single time without requiring user interaction during an auto-enroll process. This auto-enroll process may be of particular use during the manufacturing of the computing device. For example, the motherboard ROM may be flashed with the auto-enroll variable/indicator already set and the firmware in Secure Boot mode. The motherboard may be installed in the chassis and all of the optional cards may also be installed (including those without valid signatures). The system could then be powered-on. During the first boot, all signatures for all option ROMs on devices would be auto-enrolled in the UEFI Secure Boot database if not already there and the auto-enroll status indicator would then be reset to inactive mode. Thereafter, the system booting up for the consumer would perform a Secure Boot unless the auto-enroll indicator was again changed.

The way in which the auto-enroll mode is stored in the computing device is important to the functionality and security of the invention. First, the storage of the mode indicator must be non-volatile, since it must persist across a reset or platform power cycle. Second, the ability to change the mode from inactive to active must be protected so that an attacker cannot simply change it in order to allow their untrusted option ROM to execute on the next boot. There are two mechanisms that may be used to protect the mode from being changed by unauthorized individuals or processes. First, the indicator may be protected as a UEFI Authenticated Variable, as described in chapter 7.2 of the UEFI specification. Access to UEFI Authenticated Variables is restricted per the UEFI specification. This first mechanism is useful if an OS utility should be allowed to change the mode as certain trusted OS utilities may be granted access to change Authenticated Variables by signing the request to update the mode with a private key where the corresponding public key has been previously enrolled in the UEFI security database.

Figure 3:
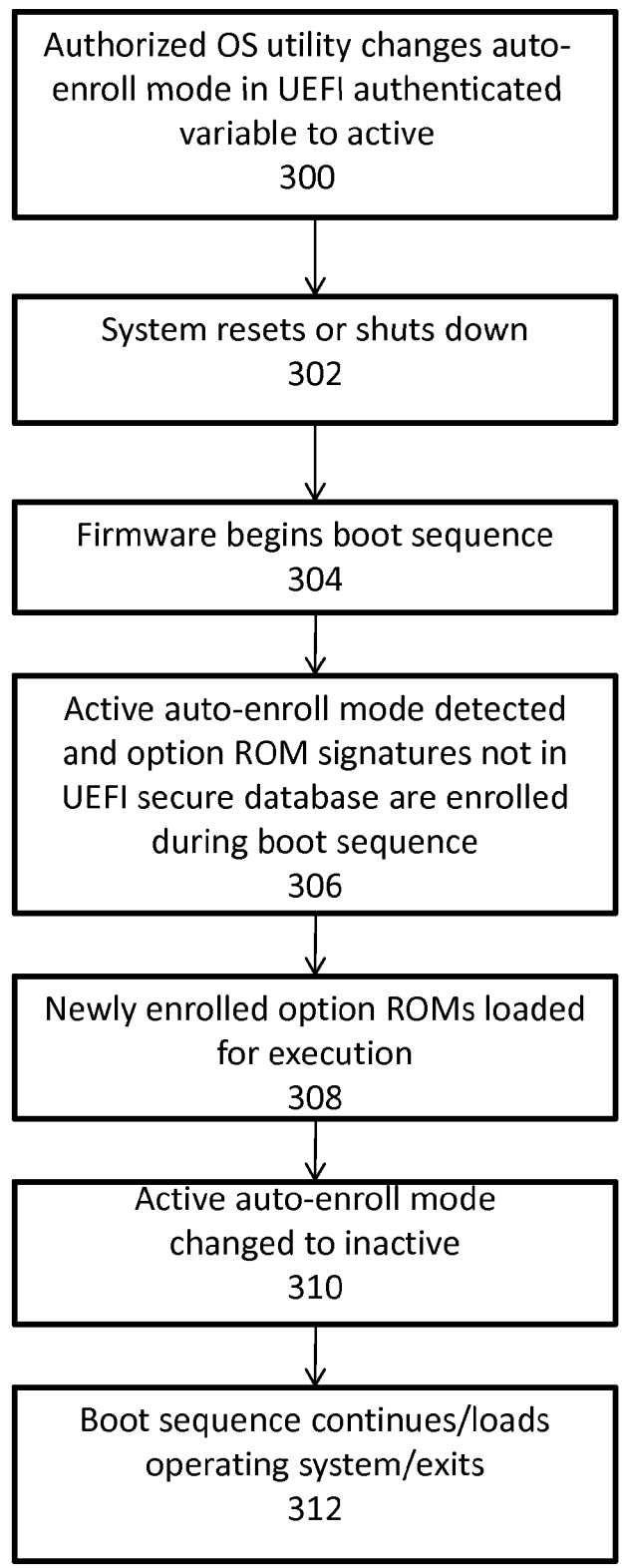
FIG. 3 depicts an exemplary sequence of steps performed by an embodiment of the present invention to set an auto-enroll indicator using an OS utility in order to auto-enroll option ROMs during a subsequent boot sequence.

FIG. 3 depicts an exemplary sequence of steps performed by an embodiment of the present invention to set an auto-enroll indicator using an OS utility in order to auto-enroll option ROMs during a subsequent boot sequence. The sequence begins when an authorized OS utility is used to change the auto-enroll mode status in a UEFI Authenticated Variable to an active mode (step 300). The computing device is then reset or turned off (step 302). When changing the auto-enroll mode (i.e. from active to inactive or inactive to active), the UEFI authenticated variable or other indicator is written with the new value and then the platform may either be reset or shut down. The platform would be reset to auto-enroll the option ROMs for devices already installed in the system. The platform would be shut down to allow new devices to be installed while the system is off. Then, when power is restored, the devices would be discovered and auto-enrolled. The computing device is then powered up to begin a boot sequence (step 304). During the boot sequence, the firmware detects the active mode status in the Authenticated Variable (indicator) and automatically enrolls all of the signatures for the detected option ROMs that were absent from the system security database (step 306). The newly enrolled option ROMs are loaded into memory for execution along with the previously enrolled option ROMs (step 308) and the firmware changes the auto-enroll mode indicated by the indicator from active to inactive (step 310). For example, the firmware may write a value to the Authenticated Variable indicative of the auto-enroll mode. It should be appreciated that in an alternate implementation, the firmware may first change the auto-enroll mode back to inactive before auto-enrolling the option ROMs whose signatures are missing from the system security database. Following the resetting of the auto-enroll mode and the auto-enrolling of the option ROMs, the boot sequence continues and eventually loads the operating system for the computing device into memory and exits (step 312).

Figure 4:
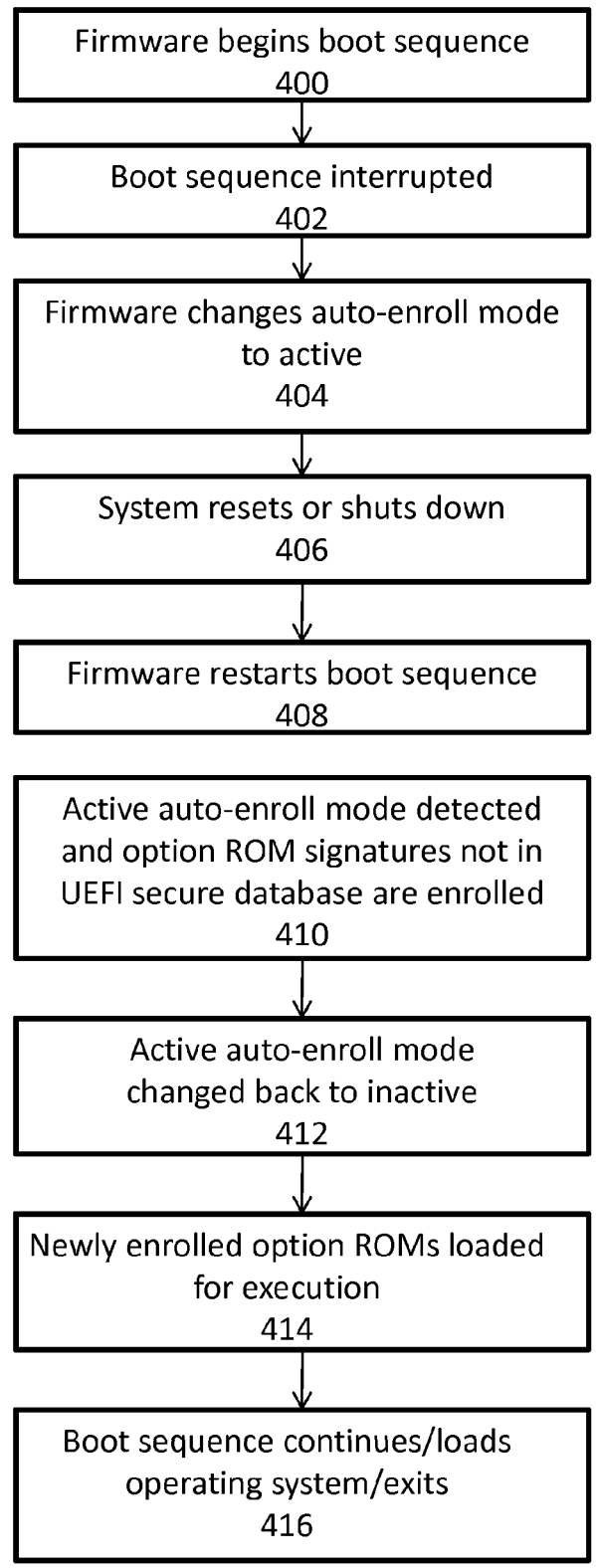
FIG. 4 depicts an exemplary sequence of steps performed by an embodiment of the present invention to set an auto-enroll indicator using firmware code during a boot sequence in order to auto-enroll option ROMs during a subsequent boot sequence.

The second mechanism by which the indicator of auto-enroll mode stored in the Authenticated Variable may be protected is to restrict changes to the auto-enroll mode to the pre-OS time period (before any OS has been loaded for the computing device). The second approach is useful if only the pre-OS application (such as the setup utility) is used, since the contents of the firmware flash device are implicitly trusted. FIG. 4 depicts an exemplary sequence of steps performed by an embodiment of the present invention to set an auto-enroll indicator using firmware code during a boot sequence in order to auto-enroll option ROMs during a subsequent boot sequence. The sequence starts with firmware beginning a boot sequence (step 400). The boot sequence is then interrupted (step 402). For example, the boot sequence may be interrupted by invoking the setup utility. Following a user request through the utility, firmware-base code changes the auto-enroll mode in the UEFI Authenticated Variable or other indicator from inactive to active (step 404) and then invokes either a reset or shut down of the computing device (step 406). The firmware restarts the boot sequence (step 408), detects the auto-enroll mode and option ROM signatures for detected devices that are absent from the system security database are auto-enrolled in the system security database (step 410). The firmware changes the auto-enroll mode in the Authenticated Variable or other indicator back to inactive (so that the next boot does not bypass the conventional Secure Boot process) (step 412). The newly enrolled option ROMs are loaded into memory for execution along with the previously enrolled drivers (step 414) and the boot system continues, eventually loads the operating system and exits (step 416).

It will be appreciated that other methods of protecting the auto-enroll mode change can also provide the necessary mode change behavior. For example, the computing device may be configured so that only a user in possession a trusted token may request the mode change.

Figure 5:
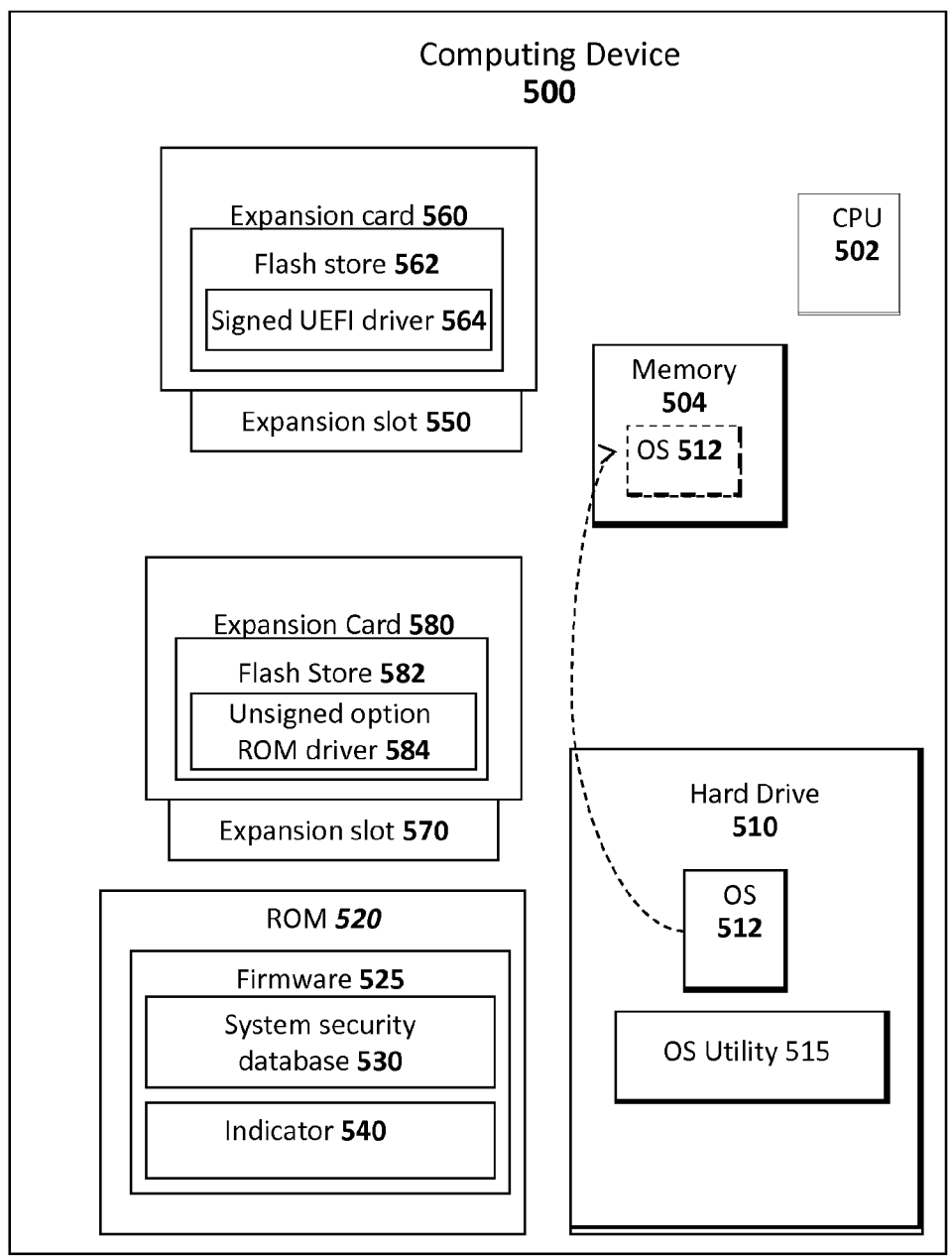
FIG. 5 depicts an exemplary environment suitable for practicing an embodiment of the present invention.

FIG. 5 depicts an exemplary environment suitable for practicing an embodiment of the present invention. A computing device 500 includes a CPU 502 used to process instructions. The computing device 500 may be a PC, laptop computer, tablet computing device, server, smartphone or some other type of computing device equipped with a processor and able to execute firmware that complies with the UEFI specification. The computing device 500 may also include a memory 504 such as Random Access Memory (RAM). An operating system 512 that is stored on a hard drive 510 or other non-volatile storage that is in, or in a location in communication with, computing device 500 may be loaded into memory 504 as part of a boot process performed by the computing device.

The computing device 500 may also include ROM 520. ROM 520 may be flash ROM and may include firmware 525 as described above that is operable at different points of the computing device's operation. The ROM 520 may also hold a system security database 530 and an indicator 540 indicative of an auto-enroll status for computing device 500. In one embodiment, indicator 540 is a UEFI Authenticated Variable.

Computing device 500 may also include an expansion slot 550 holding an expansion card 560. The expansion card 560 may include a flash store 562 holding at least one signed UEFI option ROM driver 564. A signature for signed UEFI option ROM driver 564 may be stored in system security database 530 and may be used by the firmware to perform validation of the driver during a Secure Boot process performed for computing device 500.

Computing device 500 may also include an expansion slot 570 holding an expansion card 580. The expansion card 580 may include a flash store 582 holding at least one unsigned UEFI option ROM driver 584. A signature for unsigned UEFI option ROM driver 564 may be absent from system security database 530 with the result that validation of the driver during a conventional Secure Boot process performed for computing device 500 is not possible. However, during the auto-enroll process of the present invention described herein, unsigned option ROM driver 584 may be auto-enrolled in system security database 530 during a boot process so that the functionality of expansion card 580 becomes available during the boot sequence.

Portions or all of the embodiments of the present invention may be provided as one or more computer-readable programs or code embodied on or in one or more non-transitory mediums. The mediums may be, but are not limited to a hard disk, a compact disc, a digital versatile disc, ROM, PROM, EPROM, EEPROM, Flash memory, a RAM, or a magnetic tape. In general, the computer-readable programs or code may be implemented in any computing language.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

I claim:

1. A computing device-implemented method for auto-enrolling option ROM drivers in a system security database used by firmware to perform a Unified Extensible Firmware Interface (UEFI) Secure Boot process, comprising:
   receiving a request to auto-enroll a signature for at least one option ROM driver in the system security database of the computing device, the computing device configured to execute a UEFI Secure Boot process during a boot sequence;
   changing an indicator of an auto-enroll mode stored in non-volatile storage from an inactive mode to an active mode based on the request;
   resetting or shutting down the computing device subsequent to the changing of the indicator;
   beginning the boot sequence for the computing device following the resetting or shutting down of the computing device;
   identifying at least one device having an option ROM driver whose signature is not present in the system security database during the boot sequence following the resetting or shutting down of the computing device;
   detecting the active mode of the indicator;
   bypassing the UEFI Secure Boot process based on the detecting;
   automatically enrolling, with the firmware, the signature for the at least one device in the system security database, the enrolling triggered by the detection of the active mode by the firmware without requiring a subsequent user selection associated with enrollment of the signature; and
   changing the indicator of the auto-enroll mode from the active mode to the inactive mode before exiting the boot sequence,
   wherein the option ROM driver for the at least one device is loaded into memory for execution based on the presence of the enrolled signature in the system security database.

2. The method of claim 1 wherein the indicator of the auto-enroll mode in non-volatile storage is stored in a UEFI authenticated variable and the change to the indicator is written to the authenticated variable.

3. The method of claim 1 wherein the computing device is configured to allow only code running before a loading of the operating system by the boot sequence to change the indicator.

4. The method of claim 1 wherein the computing device is configured to change the auto-enroll mode only following receipt of a command from a user in possession of a token.

5. The method of claim 1 wherein the computing device is reset subsequent to the changing of the indicator and the automatically enrolled signature is for a device already installed in the computing device at the time of reset.

6. The method of claim 1 wherein the computing device is shut down subsequent to the changing of the indicator and the automatically enrolled signature is for a device installed in the computing device following the shut down and before the boot sequence begins.

7. The method of claim 1, further comprising:
   storing information in the non-volatile storage indicating that the automatically enrolled signature for the at least one device is only valid for a single boot sequence or a pre-determined number of boot sequences.

8. A non-transitory medium holding computer-executable instructions for auto-enrolling option ROM drivers in a system security database used by firmware to perform a Unified Extensible Firmware Interface (UEFI) Secure Boot process, the instructions when executed causing the computing device to:
   receive a request to auto-enroll a signature for at least one option ROM driver in the system security database of the computing device, the computing device configured to execute a UEFI Secure Boot process during a boot sequence;
   change an indicator of an auto-enroll mode stored in non-volatile storage from an inactive mode to an active mode based on the request;
   reset or shut down the computing device subsequent to the changing of the indicator;
   begin the boot sequence for the computing device following the reset or shut down of the computing device;
   identify at least one device having an option ROM driver whose signature is not present in the system security database during the boot sequence following the resetting or shutting down of the computing device;
   detect the active mode of the indicator;
   bypass the UEFI Secure Boot process based on the detecting;
   automatically enroll, with the firmware, the signature for the at least one device in the system security database, the enrolling triggered by the detection of the active mode by the firmware without requiring a subsequent user selection associated with enrollment of the signature; and
   change the indicator of the auto-enroll mode from the active mode to the inactive mode before exiting the boot sequence,
   wherein the option ROM driver for the at least one device is loaded into memory for execution based on the presence of the enrolled signature in the system security database.

9. The medium of claim 8 wherein the indicator of the auto-enroll mode in non-volatile storage is stored in a UEFI authenticated variable and the change to the indicator is written to the authenticated variable.

10. The medium of claim 8 wherein the computing device is configured to allow only code running before a loading of the operating system by the boot sequence to change the indicator.

11. The medium of claim 8 wherein the computing device is configured to change the auto-enroll mode only following receipt of a command from a user in possession of a token.

12. The medium of claim 8 wherein the computing device is reset subsequent to the changing of the indicator and the automatically enrolled signature is for a device already installed in the computing device at the time of reset.

13. The medium of claim 12 wherein the computing device is shut down subsequent to the changing of the indicator and the automatically enrolled signature is for a device installed in the computing device following the shut down and before the boot sequence begins.

14. The medium of claim 8 wherein the instructions when executed further cause the computing device to:
   store information in the non-volatile storage indicating that the automatically enrolled signature for the at least one device is only valid for a single boot sequence or a pre-determined number of boot sequences.

15. A computing device configured to execute a UEFI Secure Boot process during a boot sequence, comprising:
   at least one expansion device;
   at least one option ROM driver for the at least one expansion device;
   non-volatile storage holding a system security database used in performing a Unified Extensible Firmware Interface (UEFI) Secure Boot process and an indicator of an auto-enroll mode for option ROM drivers in the computing device;
   firmware configured to perform the boot sequence for the computing device, wherein the firmware:
      receives a request to auto-enroll a signature for at least one option ROM driver in the system security database of the computing device;
      changes an indicator of an auto-enroll mode stored in non-volatile storage from an inactive mode to an active mode based on the request;
      resets or shuts down the computing device subsequent to the changing of the indicator;
      begins the boot sequence for the computing device following the reset or shut down of the computing device;
      identifies that a signature for the at least one option ROM driver is not present in the system security database during the boot sequence following the reset or shut down of the computing device;
      detects the indicator of the auto-enroll mode set to the active mode;
         bypasses the UEFI Secure Boot process based on the detecting; and
      automatically enrolls the signature for the at least one option ROM driver for the at least one expansion device in the system security database, the enrolling triggered by the detection of the active mode by the firmware without requiring a subsequent user selection associated with enrollment of the signature;
      wherein the at least one option ROM driver for the at least one expansion device is loaded into memory for execution based on the presence of the enrolled signature in the system security database.

16. The computing device of claim 15 wherein the indicator of the auto-enroll mode in non-volatile storage is stored in a UEFI authenticated variable.

17. The computing device of claim 15 wherein the indicator of the auto-enroll mode is changed from the active mode to an inactive mode before a subsequent boot sequence.

18. The computing device of claim 15 wherein the non-volatile storage holds information indicating that the automatically enrolled signature for the at least one device is only valid for a single boot sequence or a pre-determined number of boot sequences.

* * * * *